(12) United States Patent
Ojima et al.

(10) Patent No.: US 9,016,762 B2
(45) Date of Patent: Apr. 28, 2015

(54) VEHICLE DOOR STRUCTURE

(71) Applicant: Kabushiki Kaisha Toyota Jidoshokki, Kariya-shi, Aichi (JP)

(72) Inventors: Yoshio Ojima, Kariya (JP); Katsuya Maruyama, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 13/962,553

(22) Filed: Aug. 8, 2013

(65) Prior Publication Data
US 2014/0046551 A1 Feb. 13, 2014

(30) Foreign Application Priority Data

Aug. 10, 2012 (JP) ................. 2012-178859

(51) Int. Cl.
*E05F 15/20* (2006.01)
*E05F 11/00* (2006.01)
*B60J 5/04* (2006.01)
*B60J 5/06* (2006.01)
*E05D 15/58* (2006.01)

(52) U.S. Cl.
CPC .............. *E05F 15/2023* (2013.01); *E05F 15/20* (2013.01); *B60J 5/047* (2013.01); *B60J 5/06* (2013.01); *E05D 15/58* (2013.01); *E05Y 2900/531* (2013.01)

(58) Field of Classification Search
USPC ......... 296/155, 146.4, 146.12, 202, 143, 163; 49/209, 360, 163, 145; 160/92
See application file for complete search history.

(56) References Cited

U.S. PATENT DOCUMENTS

| 6,793,268 B1* | 9/2004 | Faubert et al. ........... 296/146.12 |
| 7,073,847 B2* | 7/2006 | Morrow et al. .......... 296/190.11 |
| 7,896,425 B2* | 3/2011 | Elliott et al. ............. 296/146.12 |
| 2006/0197357 A1* | 9/2006 | Catania ........................ 296/155 |
| 2007/0062118 A1* | 3/2007 | Lindemann et al. ............ 49/209 |
| 2009/0200833 A1* | 8/2009 | Heuel et al. ................... 296/155 |
| 2012/0167468 A1 | 7/2012 | Hozumi et al. |

FOREIGN PATENT DOCUMENTS

| JP | 2006240611 A | 9/2006 |
| JP | 201146271 A | 3/2011 |
| JP | 2012-081797 A | 4/2012 |
| JP | 201424476 A | 2/2014 |

\* cited by examiner

*Primary Examiner* — Glenn Dayoan
*Assistant Examiner* — Sunsurraye Westbrook
(74) *Attorney, Agent, or Firm* — Sughrue Mion, PLLC (57) ABSTRACT

A vehicle door structure 1 comprises a slide door panel 6 for opening and closing a front region of a rear door opening in a vehicle body 2, a swing door panel 7 for opening and closing a rear region of the rear door opening in cooperation with the slide door panel 6, an opening degree detection mechanism 30 for presuming a locked state on the slide door panel 6 and swing door panel 7 by detecting the opening degree of the slide door panel 6, and a handle idling mechanism 31, provided with the swing door panel 7, for nullifying an operation of a swing door handle 10 when the swing door panel 7 is fully closed.

6 Claims, 11 Drawing Sheets

VEHICLE DOOR STRUCTURE

BACKGROUND OF THE INVENTION

1. Field of the Invention

The present invention relates to a vehicle door structure comprising a slidably openable and closable slide door panel and a swingably openable and closable swing door panel.

2. Related Background Art

As an example of conventional vehicle door structures, one described in Japanese Patent Application Laid-Open No. 2011-46271 has been known. The vehicle door structure described in Japanese Patent Application Laid-Open No. 2011-46271 comprises a slide door panel for opening and closing a front region of a rear door opening and a swing door panel for opening and closing a rear region of the rear door opening in cooperation with the slide door panel. The slide door panel slides longitudinally of a vehicle body through a slide mechanism. When the slide door panel is fully opened and overlaid on the swing door panel, the latter rotates with respect to the vehicle body through a hinge mechanism. The vehicle door structure also comprises a slide restriction mechanism for interlocking (locking) the swing door panel and the vehicle body with each other when the swing door panel is fully opened and overlaid on the swing door panel.

However, if the swing door panel is opened while the slide and swing door panels are not locked with each other even when the slide door panel is substantially fully opened so that the slide door panel is rotatable with the swing door panel in the vehicle door structure of the prior art mentioned above, the slide door panel may jounce or shift with respect to the swing door panel during when the swing door panel rotates.

It is an object of the present invention to provide a vehicle door structure which can prevent the swing door panel from opening in the state where the slide and swing door panels are locked incompletely with each other.

SUMMARY OF THE INVENTION

In one aspect, the present invention provides a vehicle door structure comprising a slide door panel for opening and closing a first region of a door opening provided in a side or rear part of a vehicle body and a swing door panel for opening and closing a second region of the door opening in cooperation with the slide door panel; the vehicle door structure further comprising a swing door handle for opening the swing door panel, a lock unit for locking the slide and swing door panels with each other when the slide door panel has such a predetermined opening degree as to overlie the swing door panel, an operation action control unit for nullifying an operation of the swing door handle when the swing door panel is in a fully closed state, and a lock detection unit for detecting a locked state on the slide and swing door panels effected by the lock unit; wherein the operation action control unit activates the operation of the swing door handle when the locked state on the slide and swing door panels is detected by the lock detection unit.

In the case where the locked state on the slide and swing door panels is not detected when the swing door panel is fully closed in thus constructed vehicle door structure of the present invention, the operation of the swing door handle is nullified, so that the swing door panel does not open even when the swing door handle is operated. In the case where the locked state on the slide and swing door panels is detected when the swing door panel is fully closed, on the other hand, the operation of the swing door handle is activated, so that the swing door panel can be opened by operating the swing door handle. Hence, the present invention can prevent the swing door panel from opening while the slide and swing door panels are not locked with each other.

In one embodiment, the lock detection unit may be an opening degree detection unit for detecting if the slide door panel opens to the predetermined opening degree. In this case, the locked state on the slide and swing door panels can be determined by detecting if the slide door panel opens to the predetermined opening degree.

In one embodiment, the opening degree detection unit may have a detection part provided with the slide door panel, an engagement member rotatably provided with the swing door panel and adapted to engage the detection part at the predetermined opening degree, and a connection member for connecting the engagement member and the operation action control unit to each other. If the detection part hits and rotates the engagement member when the slide door panel is opened in this case, it is detected that the slide door panel attains the predetermined opening degree, whereby the operation of the swing door handle is activated. Thus, the opening degree detection unit can be constructed simply in a mechanical way.

One embodiment may be constructed such that the swing door panel is provided with a slide rail extending in an opening/closing direction of the slide door panel, the slide door panel is provided with a guide body adapted to be guided by the slide rail, and the detection part is the guide body. In this case, the readymade guide body hits the engagement member, so as to detect that the slide door panel is opened to the predetermined opening degree, whereby the number of parts can be saved from increasing.

One embodiment may be constructed such that the slide door panel is provided with a projection projecting toward the swing door panel, while the detection part is the projection. In this case, the projection hits the engagement member, so as to detect that the slide door panel is opened to the predetermined opening degree. Providing the slide door panel with the projection at an appropriate position makes it possible to accurately detect if the slide door panel is opened to the predetermined opening degree.

One embodiment may be constructed such that the swing door panel is provided with a slide rail extending in an opening/closing direction of the slide door panel, the slide door panel is provided with a guide body adapted to be guided by the slide rail, and the projection is disposed closer to the first region than is the guide body in the slide door panel. Disposing the projection closer to the first region of the door opening than is the guide body correspondingly places the engagement member on the first region side of the door opening. This makes the connection member shorter in the case where the operation action control unit is arranged on the first region side of the door opening, whereby the error in detection by the opening degree detection unit can be suppressed to a sufficiently low level.

The vehicle door structure of the present invention can prevent the swing door panel from opening in the state where the slide and swing door panels are locked incompletely with each other.

DESCRIPTION OF THE PREFERRED EMBODIMENTS

In the following, preferred embodiments of the present invention will be explained with reference to the drawings. In the drawings, the same or equivalent constituents will be referred to with the same signs while omitting their overlapping descriptions.

Figure 1:
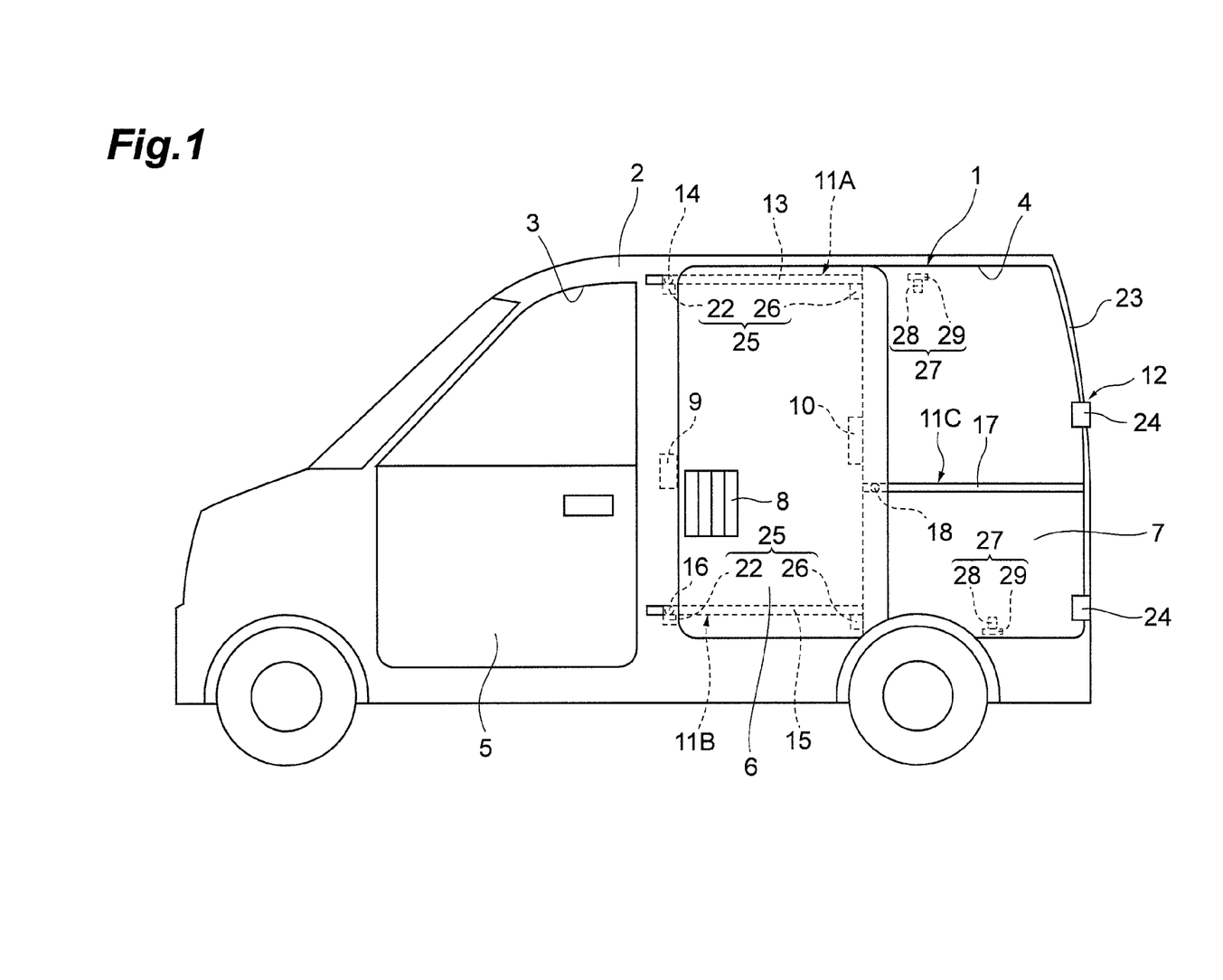
FIG. 1 is a side view illustrating a vehicle equipped with one embodiment of the vehicle door structure in accordance with the present invention.

FIG. 1 is a side view illustrating a vehicle equipped with one embodiment of the vehicle door structure in accordance with the present invention. In the drawing, a vehicle door structure 1 in accordance with this embodiment is applied to a side part of a vehicle body 2. The side part of the vehicle body 2 is formed with a front door opening 3 located beside front seats and a rear door opening 4 located beside a luggage compartment disposed behind the front seats. The front door opening 3 is opened and closed by a front door panel 5.

Figure 2A:
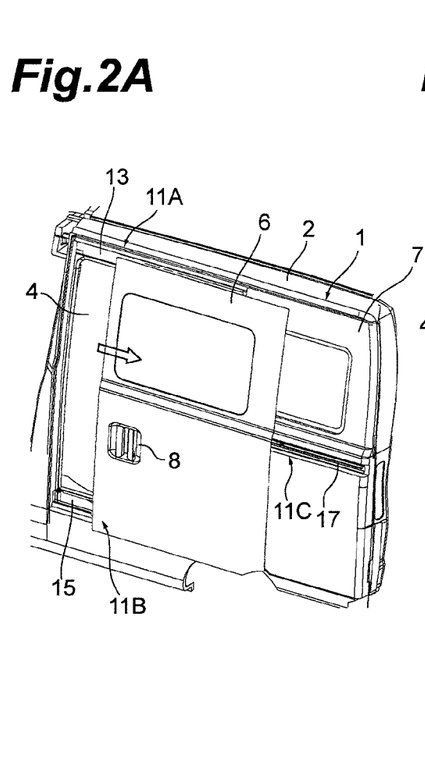
FIGS. 2A, 2B, and 2C are perspective views illustrating how slide and swing door panels are opened.
Figure 2B:
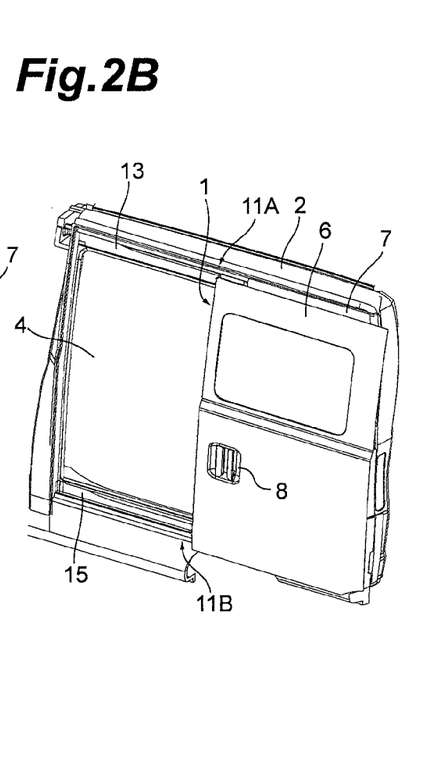

The rear door opening 4 is opened and closed by a slidably openable and closable slide door panel 6 and a swingably openable and closable swing door panel 7. The slide door panel 6 is constructed such as to slide longitudinally of the vehicle body 2 as illustrated in FIGS. 2A and 2B, thereby opening and closing a first region located on the front side of the rear door opening 4. When opened to a predetermined opening degree (fully opened in this example), the slide door panel 6 is located on the outside of the swing door panel 7 and overlies the latter (see FIG. 2B).

Figure 2C:
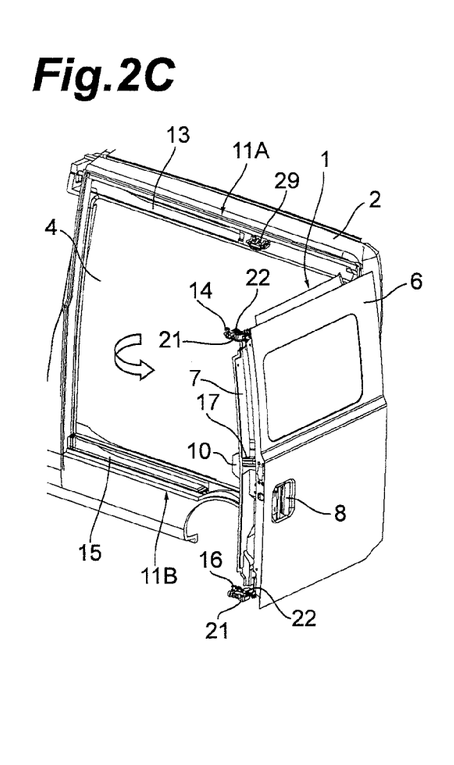

As illustrated in FIG. 2C, the swing door panel 7 is constructed so as to rotate with respect to the vehicle body 2 when the slide door panel 6 is fully opened so as to overlie the swing door panel 7, thereby opening and closing a second region located on the rear side of the rear door opening 4 in cooperation with the slide door panel 6.

The outer surface of the slide door panel 6 is provided with a slide door outer handle 8, while the inner surface of the slide door panel 6 is provided with a slide door inner handle 9. The slide door outer and inner handles 8, 9 are handles for opening the slide door panel 6. A front end part of the swing door panel 7 is provided with a swing door handle 10 for opening the swing door panel 7.

The vehicle door structure 1 comprises slide support mechanisms 11A to 11C for supporting the slide door panel 6 such that the latter is slidable longitudinally of the vehicle body 2 and a rotary support mechanism 12 for supporting the swing door panel 7 such that the latter is rotatable with respect to the vehicle body 2.

The slide support mechanism 11A has an upper slide rail 13 disposed in the upper part of the vehicle body 2 so as to extend longitudinally of the vehicle body 2 (in the opening/closing direction of the slide door panel 6) and a roller 14 disposed in the upper part of the front end of the slide door panel 6 and adapted to be guided by the upper slide rail 13 when opening and closing the slide door panel 6. The slide support mechanism 11B has a lower slide rail 15 disposed in the lower part of the vehicle body 2 so as to extend longitudinally of the vehicle body 2 and a roller 16 disposed in the lower part of the front end of the slide door panel 6 and adapted to be guided by the lower slide rail 15 when opening and closing the slide door panel 6. The slide support mechanism 11C has a middle slide rail 17 provided with the swing door panel 7 so as to extend longitudinally of the vehicle body 2 and a guide body 18 disposed in a rear end part of the slide door panel 6 and adapted to be guided by the middle slide rail 15 when opening and closing the slide door panel 6. The structure of the guide body 18 will be explained later in detail.

As illustrated in FIG. 2C, the rollers 14, 16 are supported by respective brackets 21, which are attached to the upper and lower parts of the front end of the slide door panel 6, so as to be freely rotatable. Latches 22 are attached to the brackets 21, respectively.

The rotary support mechanism 12 has two, i.e., upper and lower, hinges 24 for rotatably connecting a rear pillar 23, which is provided in a rear end part of the vehicle body 2, and the swing door panel 7 to each other.

The vehicle door structure 1 further comprises two, i.e., upper and lower, door panel lock mechanisms 25 for locking the slide door panel 6 and swing door panel 7 with each other when the slide door panel 6 is opened to the predetermined opening degree and overlies the swing door panel 7.

Figure 3:
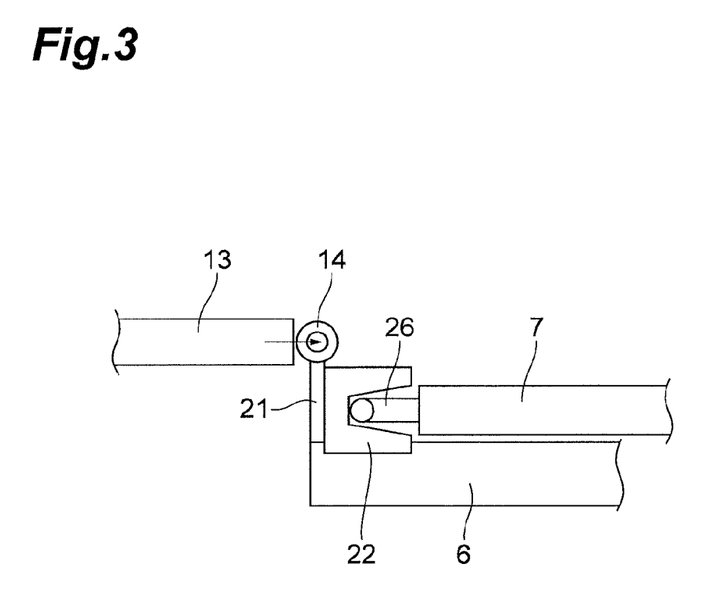
FIG. 3 is a plan view schematically illustrating a slide support mechanism and a door panel lock mechanism which are depicted in FIG. 1.

As also illustrated in FIG. 3, the door panel lock mechanisms 25 comprise the two latches 22 respectively attached to the upper and lower parts of the front end of the slide door panel 6 and two strikers 26 respectively attached to the upper and lower parts of the front end of the swing door panel 7 and adapted to engage their corresponding latches 22.

When the slide door panel 6 is opened to the predetermined opening degree (fully opened position in this example), so that the latches 22 engage the strikers 26 (see FIG. 3), the slide door panel 6 and swing door panel 7 are locked with each other. The lock on the slide door panel 6 and swing door panel 7 is released when the slide door outer handle 8 or slide door inner handle 9 is operated so as to open the slide door panel 6.

When the slide door panel 6 and swing door panel 7 are locked with each other, the upper and lower rollers 14, 16 disengage from rear end parts (roller-introducing parts) of the upper and lower slide rails 13, 15, respectively. As a consequence, the slide door panel 6 is supported by the swing door panel 7 alone through the door panel lock mechanisms 25, middle slide rail 17, and roller 18, so as to be rotatable integrally with the swing door panel 7.

The vehicle door structure 1 further comprises two, i.e., upper and lower, swing door panel lock mechanisms 27 for locking the swing door panel 7 with respect to the vehicle body 2 when the swing door panel 7 is fully closed. The swing door panel lock mechanisms 27 comprise lock members 28 respectively attached to the upper and lower parts of the swing door panel 7 and strikers 29 (see FIG. 2C) which are respectively attached to the upper and lower parts of the vehicle body 2 and adapted to engage the lock members 28.

Figure 4:
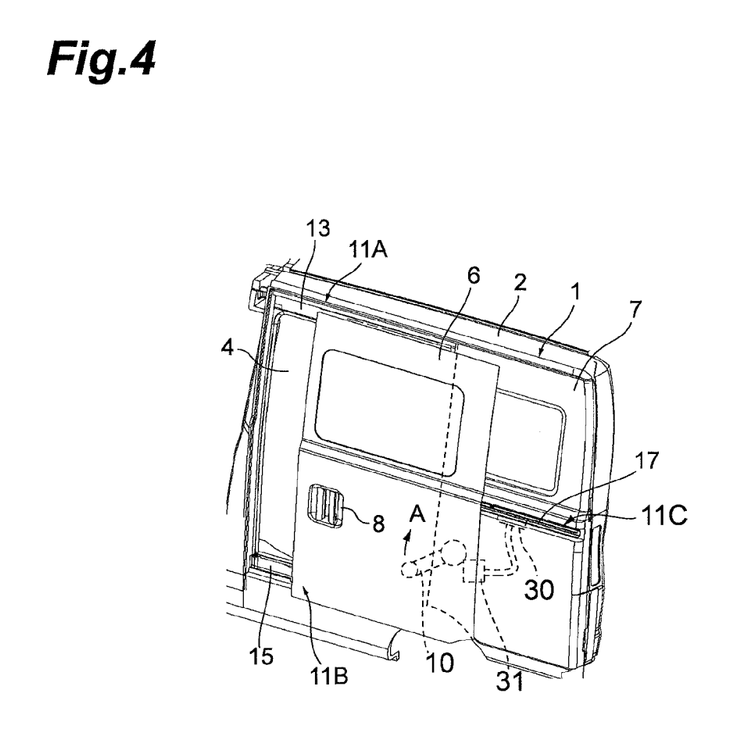
FIG. 4 is a diagram illustrating positions where an opening degree detection mechanism and a handle idling mechanism are arranged.

When the swing door panel 7 is fully closed, the lock members 28 move toward the vehicle body 2 under a force of a spring (not depicted), so as to engage the strikers 29, whereby the swing door panel 7 and the vehicle body 2 are locked with each other. The lock on the swing door panel 7 and vehicle body 2 is released when the swing door handle 10 is operated so as to open the swing door panel 7. Specifically, as illustrated in FIG. 4, the swing door handle 10 is raised in the direction of arrow A, whereby the lock on the swing door panel 7 and vehicle body 2 can be released.

When opening the slide door panel 6 and swing door panel 7 from the state where they are fully closed in thus constructed vehicle door structure 1, the slide door panel 6 is initially slid to the rear side of the vehicle body 2, so as to open to the predetermined opening degree (see FIGS. 2A and 2B). Then, while in this state, the swing door panel 7 is rotated so as to open (see FIG. 2C).

Meanwhile, there is a case where, in order to prevent the upper and lower slide rails 13, 15 from coming into contact with the rollers 14, 16, respectively, when closing the swing door panel 7, the rear end part positions of the slide rails 13, 15 are set such that the rollers 14, 16 disengage from the upper and lower slide rails 13, 15, respectively, before the slide door panel 6 is fully opened. In this case, nearly fully opening the slide door panel 6 disengages the rollers 14, 16 from the upper and lower slide rails 13, 15, respectively, and operating the swing door handle 10 without lock on the slide door panel 6 and swing door panel 7 leaves the slide door panel 6 to be supported by the swing door panel 7 with the middle slide rail 17 alone. Hence, opening the swing door panel 7 while the slide door panel 6 and swing door panel 7 are not locked with each other may jounce the slide door panel 6.

When the swing door handle 10 is operated while the slide door panel 6 is slid, the swing door panel 7 does not rotate together with the slide door panel 6, since the rollers 14, 16 are supported by the upper and lower slide rails 13, 15, respectively, but the slide door panel 6 may jounce if the lock members 28 and the strikers 29 inconveniently happen to be kept from engaging each other.

For overcoming such inconveniences, as illustrated in FIG. 4, the vehicle door structure 1 of this embodiment further comprises an opening degree detection mechanism 30 and a handle idling mechanism 31. FIGS. 1 and 2 omit the opening degree detection mechanism 30 and handle idling mechanism 31.

The opening degree detection mechanism 30 is a mechanism which, by detecting if the slide door panel 6 attains the predetermined opening degree, presumes that a locked state on the slide door panel 6 and swing door panel 7 is effected by the door panel lock mechanism 25. A part of the opening degree detection mechanism 30 is constituted by the guide body 18 provided with the slide door panel 6.

Figure 5A:
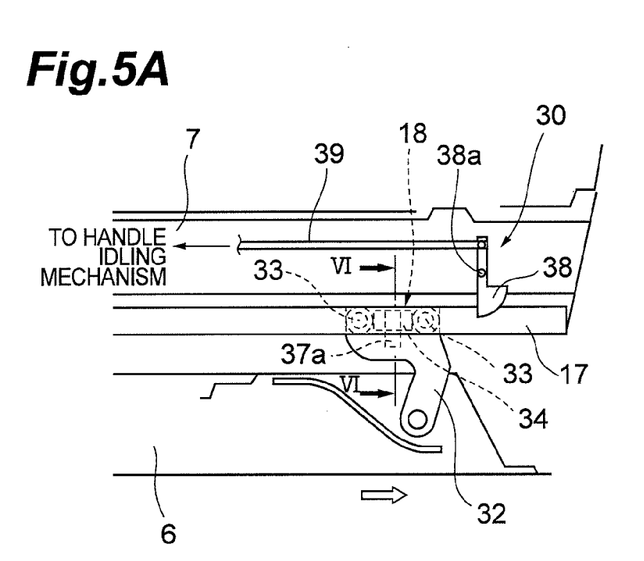
FIGS. 5A and 5B are diagrams illustrating the structure of the opening degree detection mechanism depicted in FIG. 4.
Figure 5B:
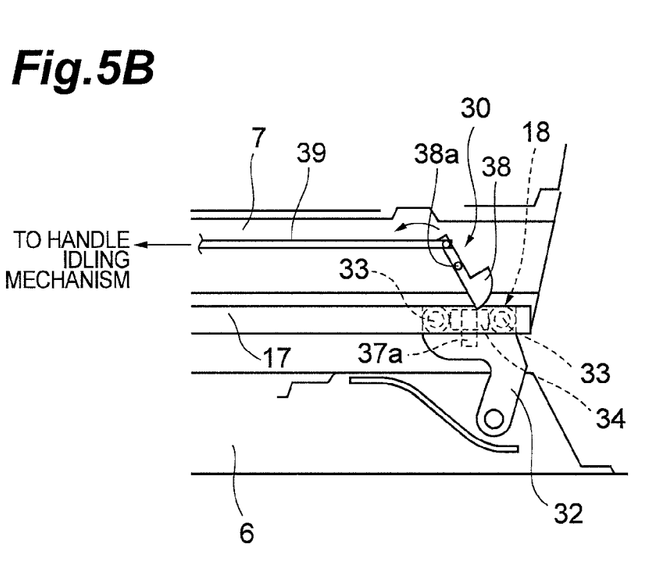
Figure 6:
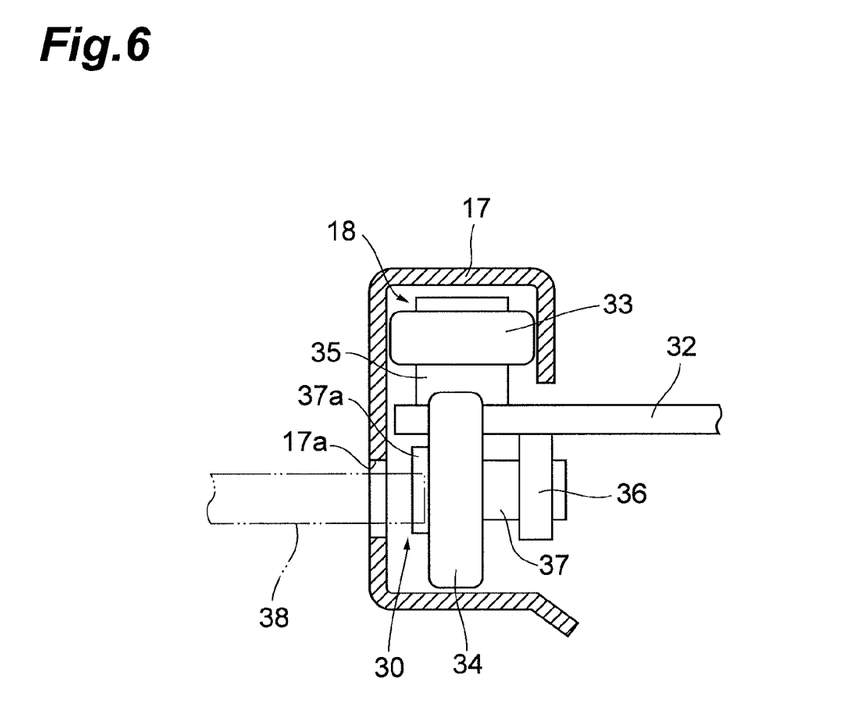
FIG. 6 is a sectional view taken along the line VI-VI of FIG. 5.

As illustrated in FIGS. 5 and 6, the guide body 18 is attached to a leading end part of a substantially L-shaped arm 32. The arm 32 is rotatably joined to the slide door panel 6 so as to extend to the outside of the vehicle body 2 (toward the swing door panel 7). The guide body 18 has a pair of, i.e., front and rear, horizontal rollers 33 and a vertical roller 34 which are guided by the middle slide rail 17. The vertical roller 34 is arranged between the pair of horizontal rollers 33. The horizontal rollers 33 are freely rotatably supported by axes 35 attached to the upper side of the arm 32. The vertical roller 34 is freely rotatably supported by an axis 37 attached to the lower side of the arm 32 through a bracket 36.

The opening degree detection mechanism 30 also has an engagement lever 38, which is swingably (rotatably) attached to the swing door panel 7 through an axis 38a and adapted to engage a head part 37a of the axis 37, and a connection member 39 for connecting the engagement lever 38 and the handle idling mechanism 31 to each other. A leading end part of the engagement lever 38 enters the middle slide rail 17 through a cutout 17a formed in an outer side part of the middle slide rail 17. The connection member 39, which is formed from a cable, a wire, or a rod, for example, is joined to a base end part of the engagement lever 38.

The opening degree detection mechanism 30 is constructed such that, when the head part 37a of the axis 37 hits and pushes the engagement lever 38, the slide door panel 6 attains the predetermined opening degree (fully opened state here), so that the slide door panel 6 and swing door panel 7 are locked with each other (see FIG. 3).

Specifically, when the slide door panel 6 is slid to the rear side, so as to open, it is determined in a stage before the head part 37a of the axis 37 of the guide body 18 hits the engagement lever 38, as illustrated in FIG. 5A, that the slide door panel 6 does not attain the predetermined opening degree (fully opened state) so that the slide door panel 6 and swing door panel 7 are not locked with each other. When the head part 37a of the axis 37 of the guide body 18 hits and pushes the engagement lever 38 as illustrated in FIG. 5B, on the other hand, it is detected that the slide door panel 6 attains the predetermined opening degree (fully opened state) so that the slide door panel 6 and swing door panel 7 are locked with each other. Here, the engagement lever 38 rotates, so that the connection member 39 is pulled toward the handle idling mechanism 31. When the slide door panel 6 and swing door panel 7 are not locked with each other, the engagement lever 38 is held in a normal state as illustrated in FIG. 5A under an urging force of a spring (not depicted), for example.

The handle idling mechanism 31 is a mechanism for idling the swing door handle 10 so as to nullify the operation of the swing door handle 10, i.e., keep the swing door panel 7 from opening even if the swing door handle 10 is operated, when the swing door panel 7 is fully closed. The handle idling mechanism 31 is disposed near the swing door handle 10 in the swing door panel 7 (see FIG. 4).

Figure 7A:
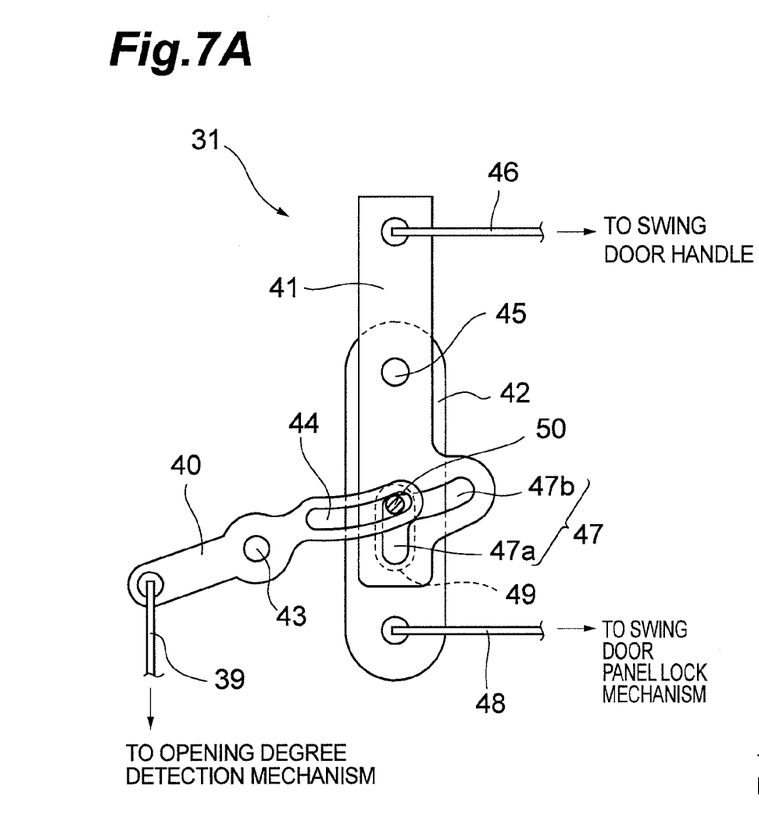
FIGS. 7A and 7B are diagrams illustrating the structure of the handle idling mechanism depicted in FIG. 4.
Figure 7B:
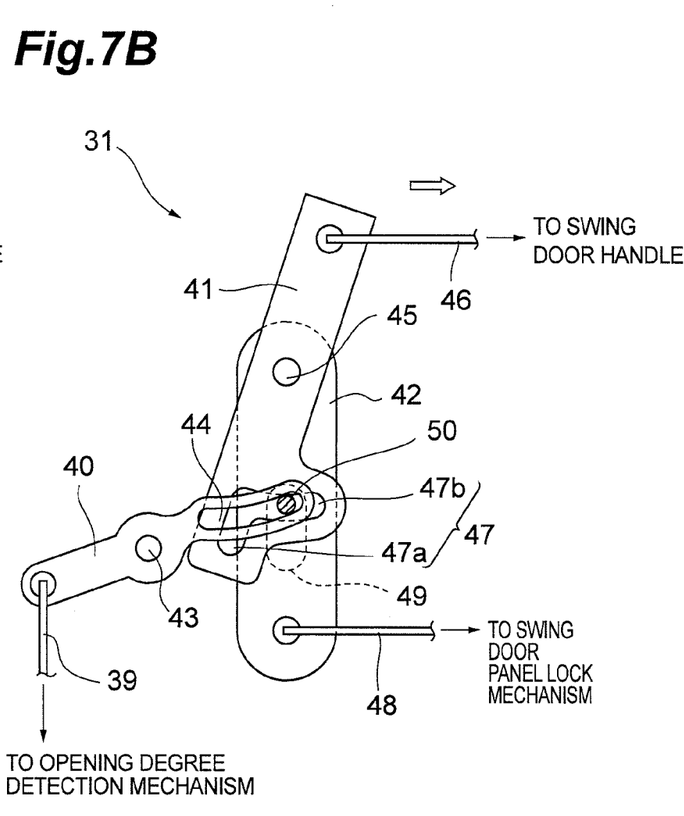

As illustrated in FIG. 7, the handle idling mechanism 31 has three planar members 40 to 42. The planar member 40 is axially supported by the swing door panel 7 through an axis 43. The connection member 39 of the opening degree detection mechanism 30 is joined to one end part of the planar member 40. The other end part of the planar member 40 is formed with a curved guide hole 44 extending longitudinally of the planar member 40.

The planar member 41 is arranged so as to extend in a direction intersecting the planar member 40. The planar member 41 is axially supported by the swing door panel 7 through an axis 45. A connection member 46 such as a wire connected to the swing door handle 10 is joined to one end part of the planar member 41. The other end part of the planar member 41 is formed with a substantially L-shaped guide hole 47. The guide hole 47 is constituted by a substantially elliptical hole part 47a extending longitudinally of the planar member 41 and a curved hole part 47b extending in a direction intersecting the longitudinal direction of the planar member 41.

The planar member 42 is arranged so as to extend in a direction intersecting the planar member 40. The planar member 42 is axially supported by the swing door panel 7 through an axis 45. A connection member 48 such as a wire connected to the swing door panel lock mechanism 27 is joined to the end part of the planar member 42 on the side opposite from the axis 45. The planar member 42 is formed with an elliptical guide hole 49 extending longitudinally thereof.

The planar members 40 to 42 are arranged so as to overlap each other. The planar member 41 is arranged between the planar members 40, 42. A pin 50 penetrates through the guide holes 44, 47, 49 of the planar members 40 to 42.

When the locked state on the slide door panel 6 and swing door panel 7 is not detected by the opening degree detection mechanism 30 as illustrated in FIG. 5A, the guide hole 44 and the hole part 47b of the guide hole 47 extend on substantially the same line in the state where the hole part 47a of the guide hole 47 and the guide hole 49 overlap each other while the guide holes 44, 47 overlap each other at the end part of the hole part 47a on the axis 45 side as illustrated in FIG. 7A. At this time, the pin 50 is located at the end part of the hole part 47a of the guide hole 47 on the axis 45 side.

When the swing door handle 10 is operated in such a state, the connection member 46 is pulled, so as to rotate and tilt the planar member 41 as illustrated in FIG. 7B. At this time, the pin 50 relatively shifts (escapes) along the hole part 47b of the guide hole 47. This prevents the planar member 42 from rotating so as to follow the rotation of the planar member 41, whereby the connection member 48 connected to the swing door panel lock mechanism 27 is not pulled. That is, even when operated, the swing door handle 10 idles. Hence, the locked state on the swing door panel 7 and vehicle body 2 effected by the swing door panel lock mechanism 27 is not released, whereby the swing door panel 7 cannot be opened.

Figure 8A:
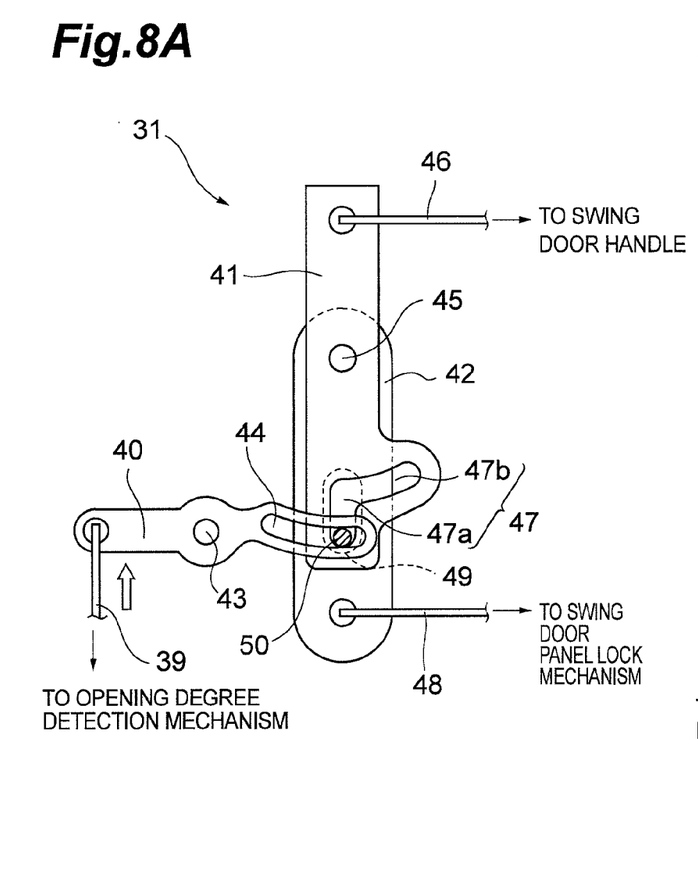
FIGS. 8A and 8B are diagrams illustrating how the handle idling mechanism acts when the opening degree detection mechanism detects that the slide door panel attains a predetermined opening degree.

When the locked state on the slide door panel 6 and swing door panel 7 is detected by the opening degree detection mechanism 30 as illustrated in FIG. 5B, on the other hand, the connection member 39 is pulled toward the handle idling mechanism 31. Therefore, as illustrated in FIG. 8A, the planar member 40 rotates, so that the hole part 47a of the guide hole 47 and the guide hole 49 overlap each other, and the guide holes 44, 47 overlap each other at the end part of the hole part 47a on the connection member 48 side. At this time, the pin 50 is located at the end part of the guide hole 47a of the guide hole 47 on the connection member 48 side.

Figure 8B:
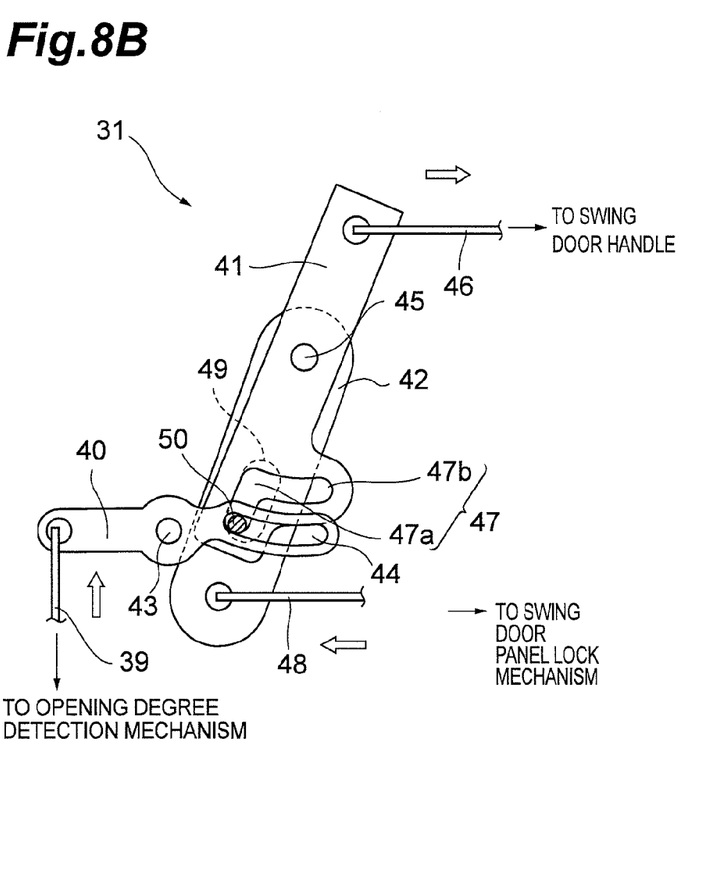

When the swing door handle 10 is operated in such a state, the connection member 46 is pulled, so as to rotate and tilt the planar member 41 as illustrated in FIG. 8B. At this time, the pin 50 cannot escape along the hole part 47b of the guide hole 47, so that the planar member 42 rotates and tilts such as to follow the rotation of the planar member 41, thereby pulling the connection member 48 connected to the swing door panel lock mechanism 27. That is, the idling state of the swing door handle 10 is released. Hence, the locked state on the swing door panel 7 and vehicle body 2 effected by the swing door panel lock mechanism 27 is released, whereby the swing door panel 7 can be opened.

The foregoing allows the handle idling mechanism 31 to nullify the operation of the swing door handle 10 when the opening degree detection mechanism 30 does not detect that the slide door panel 6 is opened to the predetermined opening degree. When the opening degree detection mechanism 30 detects that the slide door panel 6 is opened to the predetermined opening degree, on the other hand, the operation of the swing door handle 10 is activated.

In this embodiment, as in the foregoing, the handle idling mechanism 31 nullifies the operation of the swing door handle 10 when the locked state on the slide door panel 6 and swing door panel 7 is not detected by the opening degree detection mechanism 30, whereby the swing door panel 7 cannot be opened even if the swing door handle 10 is operated. This can prevent the swing door panel 7 from opening in the state where the slide door panel 6 and swing door panel 7 are not locked with each other. This can also prevent the swing door panel 7 and vehicle body 2 from being locked incompletely with each other. As a result, the slide door panel 6 can be prevented from jouncing.

Since the head part 37a of the axis 37 of the guide 18, which is a readymade part, constitutes a part of the opening degree detection mechanism 30, the number of parts can be kept from increasing, while the luggage compartment space is not lost.

Figure 9:
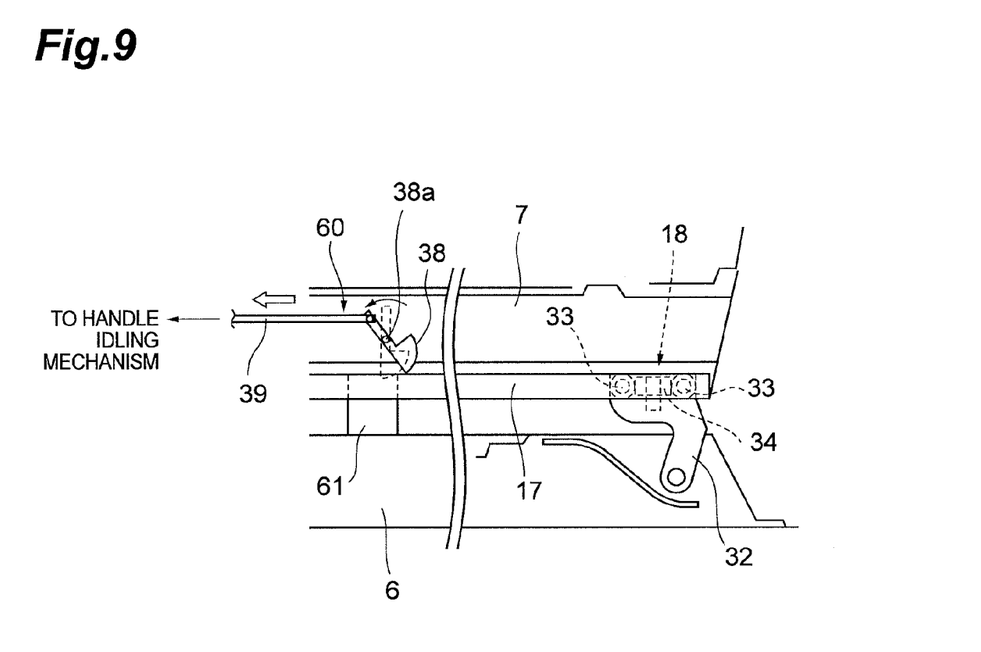
FIG. 9 is a diagram illustrating, as another embodiment of the vehicle door structure in accordance with the present invention, a modified example of the opening degree detection mechanism depicted in FIG. 5.

FIG. 9 is a diagram illustrating, as another embodiment of the vehicle door structure in accordance with the present invention, a modified example of the opening degree detection mechanism 30 depicted in FIG. 5. In FIG. 9, an opening degree detection mechanism 60 of this modified example has a detection projection 61 secured to the inner side face of the slide door panel 6. The projection 61 is arranged so as to enter the middle slide rail 17. The projection 61 is arranged on the front side of the guide body 18 (on the first region side of the rear door opening 4) in the slide door panel 6.

As with the former opening degree detection mechanism 30, the opening degree detection mechanism 60 has an engagement lever 38 and a connection member 39 which are provided with the swing door panel 7. The engagement lever 38 is a member adapted to engage the projection 61.

This opening degree detection mechanism 60 is constructed such that the slide door panel 6 attains the predetermined opening degree when the projection 61 hits and pushes the engagement lever 38, whereby the door panel lock mechanism 25 locks the slide door panel 6 and swing door panel 7 with each other (see FIG. 3).

This modified example can also prevent the swing panel 7 from opening when the slide door panel 6 and swing door panel 7 are not locked with each other and the swing door panel 7 and vehicle body 2 from being locked incompletely with each other. As a result, the slide door panel 6 can be kept from jouncing.

According to the position where the projection 61 is attached, the engagement lever 38 is arranged more forward in the vehicle body 2 than that of the embodiment illustrated in FIG. 5, whereby the connection member 39 becomes shorter correspondingly. This can sufficiently suppress the error in detection by the opening degree detection unit 60.

Figure 10:
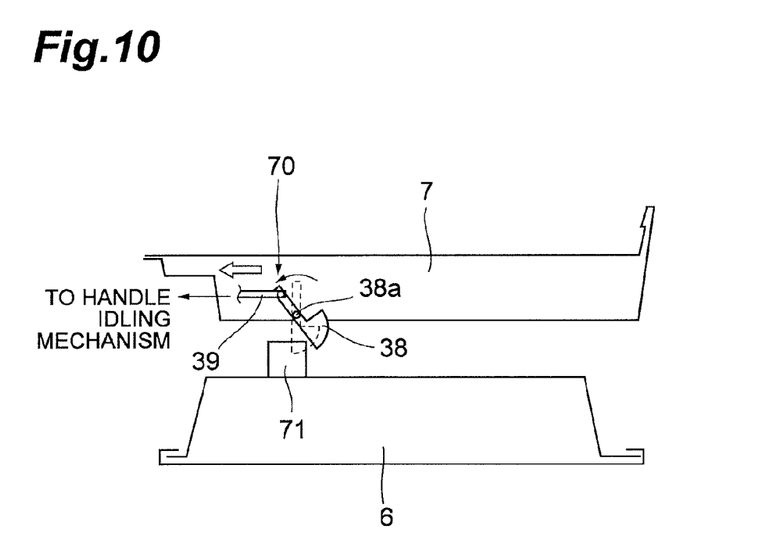
FIG. 10 is a diagram illustrating, as still another embodiment of the vehicle door structure in accordance with the present invention, a modified example of the opening degree detection mechanism depicted in FIG. 9.
Figure 11A:
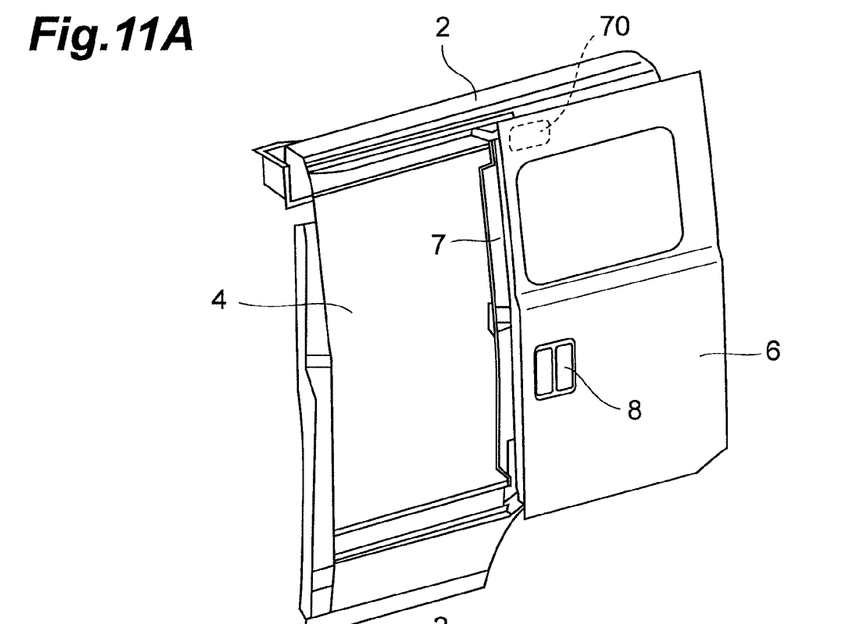
FIGS. 11A and 11B are diagrams illustrating positions where the opening degree detection mechanism depicted in FIG. 10 is arranged.

FIG. 10 is a diagram illustrating, as still another embodiment of the vehicle door structure in accordance with the present invention, a modified example of the opening degree detection mechanism 60 depicted in FIG. 9. In FIG. 10, an opening degree detection mechanism 70 of this modified example is disposed in upper parts of front ends of the slide door panel 6 and swing door panel 7 as illustrated in FIG. 11A.

Specifically, a detection projection 71 is secured to the inner side face of the upper part of the front end of the slide door panel 6. The upper part of the front end of the swing door panel 7 is provided with the above-mentioned engagement lever 38 and connection member 39. The engagement lever 38 is a member adapted to engage the projection 71.

This opening degree detection mechanism 70 is constructed such that the slide door panel 6 attains the predetermined opening degree when the projection 71 hits and pushes the engagement lever 38, whereby the door panel lock mechanism 25 locks the slide door panel 6 and swing door panel 7 with each other (see FIG. 3).

This modified example can also prevent the swing panel 7 from opening when the slide door panel 6 and swing door panel 7 are not locked with each other and the swing door panel 7 and vehicle body 2 from being locked incompletely with each other. As a result, the slide door panel 6 can be kept from jouncing.

Figure 11B:
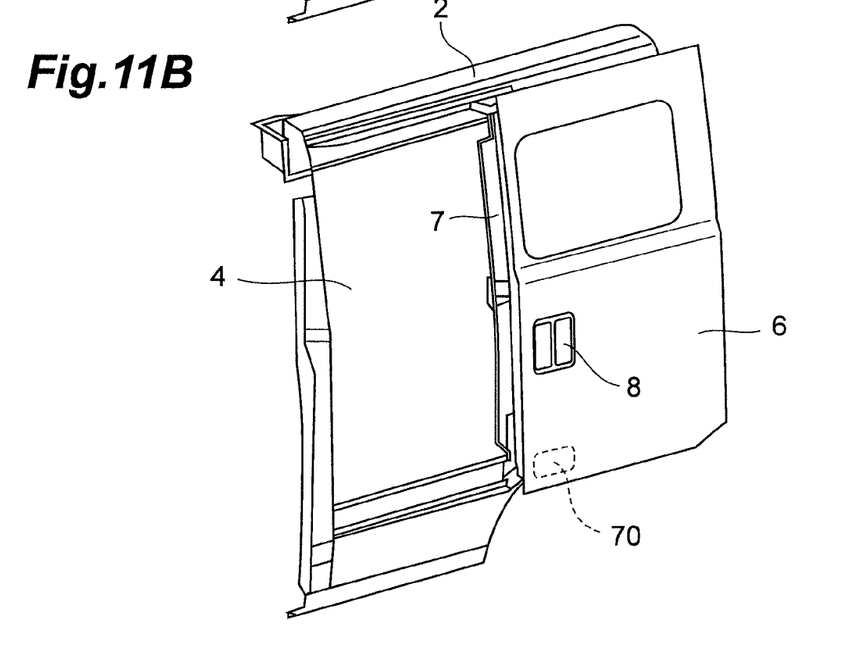

The opening degree detection mechanism 70 may also be provided in lower parts of front ends of the slide door panel 6 and swing door panel 7 as illustrated in FIG. 11B.

Though some preferred embodiments of the present invention are explained in the foregoing, the present invention is not limited thereto. For example, while the embodiment illustrated in FIGS. 5 and 6 uses the head part 37a of the axis 37 in the guide body 18 as a detection part adapted to engage the engagement lever 38, the head part 37a may be provided with a detection projection adapted to engage the engagement lever 38.

Though the opening degree detection mechanisms 30, 60, 70 are arranged only on the side face of the slide door panel 6 in the above-mentioned embodiments, this is not restrictive in particular; opening degree detection mechanisms may be disposed in other parts of the slide door panel 6. An opening degree detection mechanism disposed near the door panel lock mechanism 25 can increase the accuracy of detecting if the slide door panel 6 opens to the predetermined opening degree.

Though the above-mentioned embodiments provide the opening degree detection mechanisms 30, 60, 70 adapted to presume, by detecting if the slide door panel 6 attains the predetermined opening degree, that a locked state on the slide door panel 6 and swing door panel 7 is effected by the door panel lock mechanism 25, means for detecting the locked state on the slide door panel 6 and swing door panel 7 are not limited thereto. For example, a sensor for detecting whether or not the striker 26 is arranged within the latch 22 may be provided, and when it is detected that the striker 26 is arranged within the latch 22, it may be determined that the slide door panel 6 and swing door panel 7 are locked with each other, so as to allow the handle idling mechanism 31 to activate the swing door handle 10.

Though the above-mentioned embodiments are constructed such that the slide door panel 6 opens and closes the first region located on the front side of the rear door opening 4 while the swing door panel 7 opens and closes the second region located on the rear side of the rear door opening 4 in cooperation with the slide door panel 6, the vehicle door structure of the present invention is also applicable to one constructed such that the slide door panel 6 opens and closes the first region located on the rear side of the rear door opening 4 while the swing door panel 7 opens and closes the second region located on the front side of the rear door opening 4 in cooperation with the slide door panel 6. The vehicle door structure of the present invention is also applicable to one having slide and swing door panels for opening and closing a door opening provided in the rear part of the vehicle body 2.

What is claimed is:

1. A vehicle door structure comprising:
a slide door panel for opening and closing a first region of a door opening provided in a side or rear part of a vehicle body;
a swing door panel for opening and closing a second region of the door opening in cooperation with the slide door panel;
a slide door mechanism on which the slide door panel is attached so as to enable sliding with respect to the vehicle body and the swing door panel and allow movement of the slide door panel between a closed position in which the first region is closed and an open position in which the first region is fully open and the slide door panel overlies the swing door panel;
a swing door mechanism supporting the swing door panel so as to enable swinging of the swing door panel with respect to the vehicle body so as to allow the swing door panel to swing between a closed position in which the swing door panel covers the second region and an open position in which the second region is open, the swing door mechanism allowing the swing door panel to swing when the slide door panel is in the open position;
a swing door handle for opening the swing door panel;
a lock unit for locking the slide and swing door panels with each other when the slide door panel has such a predetermined opening degree as to overlie the swing door panel;
an operation action control unit for nullifying an operation of the swing door handle when the swing door panel is in a fully closed state; and
a lock detection unit for detecting a locked state on the slide and swing door panels caused by the lock unit;
wherein the operation action control unit activates the operation of the swing door handle when the locked state on the slide and swing door panels is detected by the lock detection unit.

2. A vehicle door structure according to claim 1, wherein the lock detection unit is an opening degree detection unit for detecting if the slide door panel opens to the predetermined opening degree.

3. A vehicle door structure according to claim 2, wherein the opening degree detection unit has a detection part provided with the slide door panel, an engagement member rotatably provided with the swing door panel and adapted to engage the detection part at the predetermined opening degree, and a connection member for connecting the engagement member and the operation action control unit to each other.

4. A vehicle door structure according to claim 3, wherein the swing door panel is provided with a slide rail extending in an opening/closing direction of the slide door panel;
wherein the slide door panel is provided with a guide body adapted to be guided by the slide rail; and
wherein the detection part is the guide body.

5. A vehicle door structure according to claim 3, wherein the slide door panel is provided with a projection projecting toward the swing door panel; and
wherein the detection part is the projection.

6. A vehicle door structure according to claim 5, wherein the swing door panel is provided with a slide rail extending in an opening/closing direction of the slide door panel;
wherein the slide door panel is provided with a guide body adapted to be guided by the slide rail; and
wherein the projection is disposed closer to the first region than is the guide body in the slide door panel.

* * * * *